(12) United States Patent
Rassaian et al.

(10) Patent No.: US 7,558,639 B2
(45) Date of Patent: Jul. 7, 2009

(54) METHOD AND APPARATUS FOR INTEGRATED HIERARCHICAL ELECTRONICS ANALYSIS

(75) Inventors: Mostafa Rassaian, Bellevue, WA (US); David W. Twigg, Federal Way, WA (US); Jung-Chuan Lee, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 348 days.

(21) Appl. No.: 11/549,819

(22) Filed: Oct. 16, 2006

(65) Prior Publication Data

US 2008/0104553 A1 May 1, 2008

(51) Int. Cl.
*G06F 17/50* (2006.01)
*G06F 19/00* (2006.01)

(52) U.S. Cl. .............................. 700/98; 716/15; 716/4; 703/13

(58) Field of Classification Search ...... 716/4, 716/15; 700/98; 703/13
See application file for complete search history.

(56) References Cited

U.S. PATENT DOCUMENTS 5,958,556 A * 9/1999 McCutcheon ............... 428/172
6,363,789 B1 4/2002 Rassaian et al.
6,813,749 B2 11/2004 Rassaian
2006/0020456 A1 1/2006 Rassaian et al.

OTHER PUBLICATIONS

U.S. Appl. No. 11/375,225, filed Mar. 14, 2006, Rassaian et al.

\* cited by examiner

*Primary Examiner*—Stacy A Whitmore
(74) *Attorney, Agent, or Firm*—Yee & Associates, P.C.; John A. Lepore (57) ABSTRACT

A computer implemented method, apparatus, and computer usable program code for analyzing durability of electronic components. A finite element model for the chassis is created. A set of finite element models for a set of printed wiring assemblies are created, wherein the printed wiring assemblies are for use with chassis and include the electronic components. The finite element model for the chassis is combined with the set of finite element models to form a combined finite element model. A finite element analysis of the combined finite element model is performed to form results. The combined model results are transferred to the printed wiring board models. Using the transferred results, stresses and strains are calculated for individual solder joints/leads. A fatigue analysis is performed for the electronic components in the set of printed wiring assemblies based on these stresses and strains, using the results to identify the durability of the electronic components.

20 Claims, 8 Drawing Sheets

```
Form_finite_element_model_of_cabinet_and_PWAs
Apply_loads_at_cabinet_attachment_points
Analyze_Finite_Element_model_of_cabinet_and_PWAs_under_vibration_loading
 For n = 1 to number_of_PWAs
   for k=1 to number_of_parts_on_PWA_n
     extract_vibration_magnitude_at_location_of_part_k_on_PWA_n
     analyze_fatigue_life_of_part_k_on_PWA_n
   end loop k
 end loop n
```

EVENTS 1102

Legend:
- 0.0-0.020
- 0.021-0.040
- 0.041-0.060
- 0.061-0.080
- 0.081-0.100
- 0.101-0.120
- 0.121-0.140
- NOT MAPPED

CDI RANGE 1104

METHOD AND APPARATUS FOR INTEGRATED HIERARCHICAL ELECTRONICS ANALYSIS

BACKGROUND OF THE INVENTION

1. Field of the Invention

The present invention relates generally to failure analysis and in particular to a method and apparatus for determining when components will fail. Still more particularly, the present invention relates generally to a computer implemented method, apparatus, and computer usable program code for determining the fatigue life of electronic components on printed wiring assemblies mounted on a chassis.

2. Description of the Related Art

Aircraft contain a number of different systems and components that are necessary for proper operation. Failures of components, such as avionics, are a major driver of costs for both and commercial and combat aircraft. Avionics are aviation electronics and include electrical systems designed for use on an aircraft. These systems may include, for example, electronics used for communication, navigation, and the display and management of different systems. Vibration is a major consideration in the design of avionics for many aircraft, especially aggressive aircraft like helicopters and combat fighters.

A need is present to assess the durability of aviation electronics mounted in or on a housing or a chassis that are located in hostile environments, such as outside the hull of an aircraft. Thermal changes are another factor in designing systems. The durability of aviation electronics is currently performed through hours of testing by subjecting the system to vibrations and/or thermal cycles that simulate the intended operating environment. Evaluation of the design of a printed wiring assembly produced by a designer can be improved by constructing and analyzing a finite element model of this design. With respect to vibration analysis, dynamic loads that are applied to the points connecting the printed wiring assembly to the external environment. Thereafter, prototypes or experimental boards may be manufactured and tested by subjecting those boards to different vibration loads in a laboratory in which vibrations may be reproduced for testing purposes. Additionally, the aviation electronics are tested by placing the components on actual aircraft for testing. If the system does not pass the test, a redesign of the system is made and another prototype is built and tested. The analytic tool allows design evaluation/modification cycles to be largely completed prior to manufacturing.

This type of testing system is time consuming and expensive in generating of the final design of the aviation electronics for production. Therefore, it would be advantageous to have an improved method and apparatus to determine the fatigue life of components on printed wiring assemblies mounted on a chassis.

SUMMARY OF THE INVENTION

Advantageous embodiments of the present invention provide a computer implemented method, apparatus, and computer usable program code for analyzing durability of electronic components. A finite element model for the chassis is created. Finite element models for a set of printed wiring assemblies are created, wherein the printed wiring assemblies are for use with chassis and include the electronic components. The finite element model for the chassis is combined with the set of finite element models to form a combined finite element model. A finite element analysis of the combined finite element model is performed to form results. A fatigue analysis is performed for the electronic components in the set of printed wiring assemblies using the results to identify the durability of the electronic components. This analysis may be, for example, a thermal analysis, a vibration analysis, or a combination of the two.

In another embodiment, a first finite element model is created for a chassis for electronic components. A set of second finite element models is created for the set of printed wiring assemblies that are mounted in the chassis. The first finite element model is combined with the set of second set of finite element models to form a combined finite element model. A finite element analysis is performed for the combined finite element model to determine a response of the combined finite element model to a vibration spectrum to form results. The vibration loads are applied in the finite element analysis through mounting locations on the chassis and propagate through attachment points for the set of printed wiring assemblies in which the attachment points are points at which the set of printed wiring assemblies are attached to the chassis. Vibration levels are extracted at part locations for the set of printed wiring assemblies. A fatigue analysis is performed for solder connections and leads in the set of printed wiring assemblies using the extracted vibration levels to identify the durability of electronic components.

In yet another embodiment, a computer program product includes a computer usable medium. This medium has computer usable program code for analyzing the durability of electronics. The computer usable program code creates a finite element model for the chassis and creates a set of finite element models for the set of printed wiring assemblies in which the printed wiring assemblies are for use with the chassis and include the electronic components. The computer usable program code also combines the finite element model for the chassis with the set of finite element models for the set of printed wiring assemblies to form a combined finite element model. A finite element analysis is performed of the combined finite element model to form results using the computer usable program code. Thereafter, a fatigue analysis is performed for the electronic components in the set of printed wiring assemblies using the results to identify the durability of the electronics through the computer usable program code.

The features, functions, and advantages can be achieved independently in various embodiments of the present invention or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION OF THE PREFERRED EMBODIMENT

Figure 1:
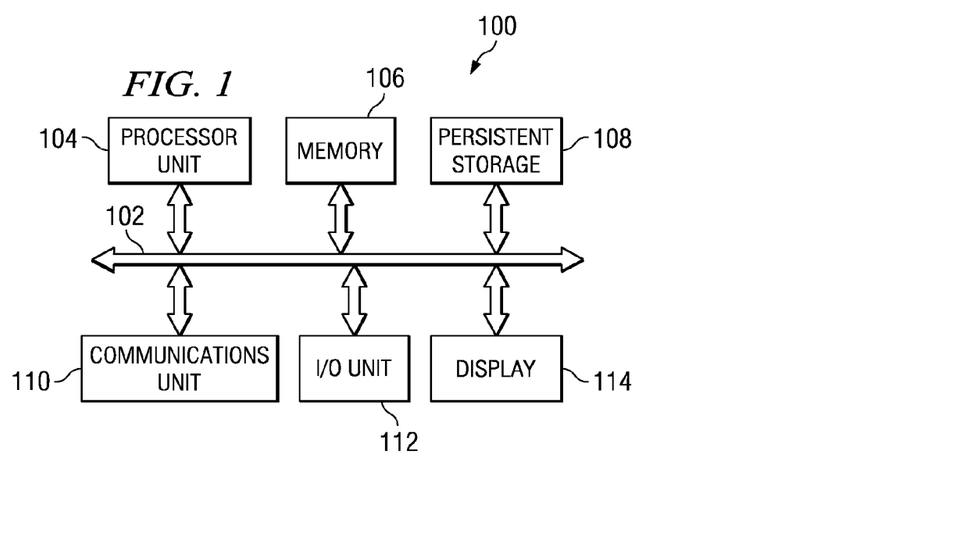
FIG. 1 is a diagram of a design system in accordance with an advantageous embodiment of the present invention.

Turning now to FIG. 1, a diagram of a design system is depicted in accordance with an advantageous embodiment of the present invention. In this illustrative example, data processing system 100 includes communications fabric 102, which provides communications between processor unit 104, memory 106, persistent storage 108, communications unit 110, I/O unit 112, and display 114.

Processor unit 104 serves to execute instructions for software that may be loaded into memory 106. Processor unit 104 may be a set of one or more processors or may be a multiprocessor core, depending on the particular implementation. Memory 106, in these examples, may be, for example, a random access memory. Persistent storage 108 may take various forms depending on the particular implementation. For example, persistent storage 108 may be, for example, a hard drive, a flash memory, a rewritable optical disk, a rewritable magnetic tape, or some combination of the above.

Communications unit 110, in these examples, provides for communications with other data processing systems or devices. In these examples, communications unit 110 is a network interface card. I/O unit 112 allows for input and output of data with other devices that may be connected to data processing system 100. For example, I/O unit 112 may provide a connection for user input though a keyboard and mouse. Further, I/O unit 112 may send output to a printer. Display 114 provides a mechanism to display information to a user.

Instructions for the operating system and applications or programs are located on persistent storage 108. These instructions and may be loaded into memory 106 for execution by processor unit 104. The processes of the different embodiments may be performed by processor unit 104 using computer implemented instructions, which may be located in a memory, such as memory 106.

The different advantageous embodiments of the present invention may be implemented in instructions executed by data processing system 100 to determine fatigue life of electronic components that are located in a housing or chassis. An electronic component is any component or item that is used on a printed wiring assembly for which durability analysis is desired. These electronic components include, for example, electronic devices, leads and packaging for the electronic devices and soldering used to attach the electronic devices to a board in the printed wiring assembly. The different embodiments may be used to analyze both vibration and thermal loads applied to at test unit.

The advantageous embodiments recognize that the current system for testing printed wiring assemblies for a highly accelerated life test is inadequate. The advantageous embodiments also recognize that current modeling systems apply loads to connection points for printed wiring assemblies, which are often inadequate to accurately simulate the dynamic loads that may occur during actual usage in a printed wiring assembly within a chassis or other housing. With the currently used testing system, the different embodiments recognize that a number of deficiencies are present.

For example, shaker table loads are applied directly to the printed wiring assembly attachment points and are known with reasonable accuracy. However, if the printed wiring assembly is mounted inside a cabinet or chassis, possibly with other printed wiring assemblies, the known loads are not directly applied to the printed wiring assembly connection points. Instead, the loads are applied to the chassis through the chassis connections to the platform in which the chassis is installed. The loads at the printed wiring assembly connection points depend on the loads applied to the cabinet and interaction of the printed wiring assembly in the cabinet. Thus, the advantageous embodiments recognize that the currently used analysis does not provide accurate loads applied to individual printed wiring assemblies, resulting in inaccuracies in the fatigue analysis.

Thus, the advantageous embodiments of the present invention provide a computer implemented method, apparatus, and computer usable program code for analyzing these electronic components accurately. In the advantageous embodiments, the printed wiring assemblies are simulated as part of a model that contains chassis and other printed wiring assemblies. A finite element model is created for the chassis. Also, a set of finite element models is created for a set of printed wiring assemblies. The printed wiring assemblies are for use with a chassis and include the electronic components. The set of finite element models may be one or more models for one or more printed wiring assemblies depending on the particular implementation. The finite element model for the chassis is combined with the set of finite element models to form a combined finite element model.

A finite element analysis is performed on the combined finite element model to generate results. A fatigue analysis for the components in the set of printed wiring assemblies is performed using the results to identify the durability of the electronic components on the set of printed wiring assemblies.

A finite element model of components includes a mesh in which nodes are used to define the shape of the mesh. A mesh is a representation of the object, being modeled and may be two dimensional or three dimensional in the finite element model. A mesh contains a set of discrete nodes and elements. The elements are connected by the nodes. Each node in the mesh is assigned discrete degrees of freedom. The mesh is used to create a structure mathematically similar the object being modeled. The different embodiments of the present invention may employ any currently used finite element modeling system.

The different embodiments form a finite element model of the chassis with the printed wiring assemblies installed and analyze the combined model under loads applied to the chassis connection points. This application of loads is more accurate than the current systems, which apply loads to the connection points for the different printed wiring assemblies. The vibration response at part locations on individual printed wiring assemblies is extracted directly from the combined model. This approach using the different embodiments of the present invention improves the accuracy of the dynamic loading applied to the parts. In turn, the accuracy of the fatigue analysis of the parts also is improved.

The different illustrative embodiments generate finite element models for the printed wiring assemblies and merge them into a finite element model of the chassis to form a unit. These embodiments recognize that because the part locations are known on the individual printed wiring assembly, it is convenient to generate finite element models of the printed wiring assemblies individually and then merge them with a finite element model of the chassis. This location information is often available electronically and is specified in a coordinate system that is local to the printed wiring assembly. Of course, other methods of modeling the chassis with the installed printed wiring assembly also may be employed depending on the particular implementation. Furthermore, the different embodiments also apply the same generation of a finite element model for the unit with respect to thermal or noise analysis.

Thereafter, thermal loads and cabinet cooling mechanisms, if any, are applied. The temperature distribution inside the unit may then be analyzed. From this analysis, temperature cycling for each part location may be extracted and the fatigue for the part may be analyzed.

Figure 2:
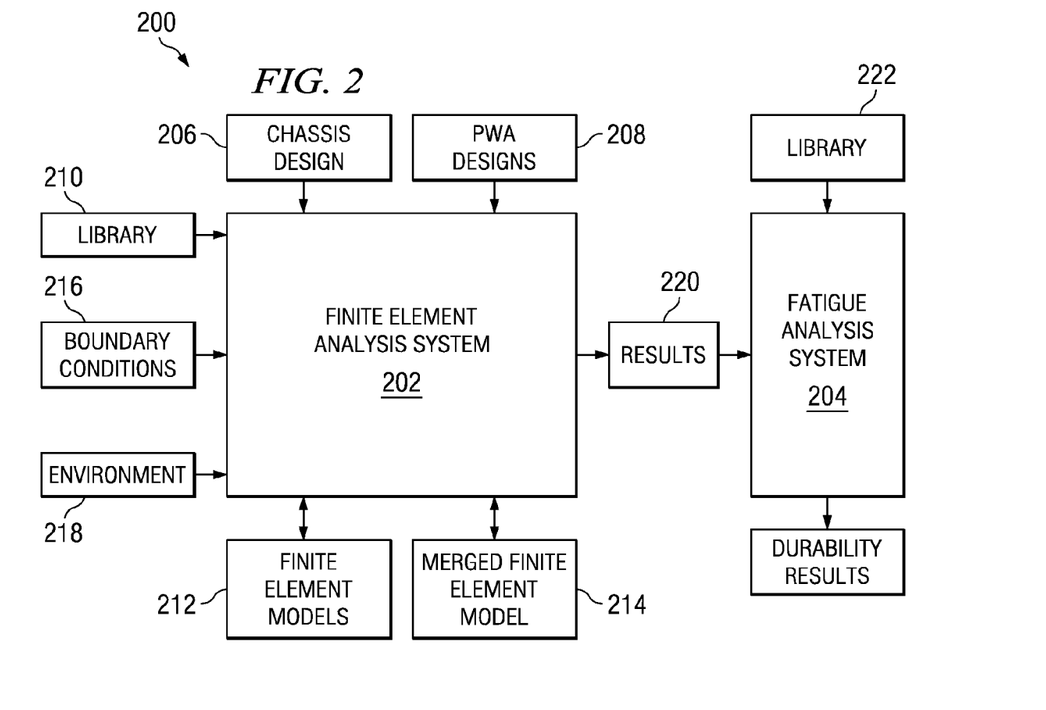
FIG. 2 is a diagram illustrating an integrated hierarchical electronics analysis tool in accordance with an advantageous embodiment of the present invention.

Turning now to FIG. 2, diagram illustrating an integrated hierarchical electronics analysis tool is depicted in accordance with an advantageous embodiment of the present invention. Analysis tool 200 may be used to analyze the durability of electronics inside a unit that comprises a chassis and multiple printed wiring assemblies mounted on or inside of the chassis. Analysis tool 200 includes finite element analysis system 202 and fatigue analysis system 204.

Chassis design 206 is received by finite element analysis system 202. This design may be, for example, a design file from a computer aided design file system or from information entered by a user. Information used by finite element analysis system 202 from chassis design 206 includes, for example, geometry, materials, details of connections to the external environments and details of printed wiring assembly attachments. The connection to the external environment may include, for example, bolts and shock absorbers. Boundary conditions 216 specify how the chassis is attached to an external environment. For example, the boundary conditions may specify the locations on the chassis that are attached and whether the method of attachment to the chassis is rigid or flexible.

Finite element analysis system 202 also receives printed wiring assembly (PWA) designs 208. These designs may take the form of one or more files for a set of printed wiring assemblies. This set of printed wiring assemblies may be one or more printed wiring assemblies that are either located within the chassis or attached to the chassis.

The information in printed wiring assembly designs 208 contains sufficient information about each printed wiring assembly to construct a finite element model for accurate random vibration analysis. This information includes, for example, printed wiring assembly geometry, materials that the printed wiring assemblies construct or form, and part locations. Further, detailed information about the part is also included in printed wiring assembly designs 208. This information includes, for example, package geometry, and package material and package weight. Alternatively, information about the individual parts may be stored in library 210 rather that being included in printed wiring assembly designs 208 for efficiency because these parts are reused in different designs.

Finite element analysis system 202 creates a finite element model of the printed wiring assembly and the attached parts. The finite element model of a printed wiring assembly includes the different electronic components. Additionally, finite element analysis system 202 also creates a finite element model for the chassis from chassis design 206. These different models are stored as finite element models 212. After the finite element models for the chassis and the printed wiring assemblies have been created, finite element analysis system 202 merges finite element models 212 to form merged finite element model 214. Inheriting from the model for chassis, merged finite element model 214 includes boundary conditions 216.

Thereafter, finite element analysis system 202 performs a random vibration analysis of the merged finite element model 214 with boundary conditions 216. This analysis is performed using environment 218. Environment 218 specifies the vibration or noise environment as a vibration or noise spectrum. For example, environment 218 may specify vibration frequency versus amplitude such that different vibration frequencies will have different amplitudes. Further, finite element analysis system 202 performs a random vibration analysis on merged finite element model 214. This type of analysis assesses the response of merged finite element model 214 to a vibration environment to generate results 220. Results 220 are an average of displacements and accelerations at the nodes in merged finite element model 214. Results 220 are used as inputs to fatigue analysis system 204.

Fatigue analysis system 204 extracts accelerations at nodes or elements in the mesh in the finite element model for the different printed wiring assemblies. In other words, fatigue analysis system 204 identifies the accelerations and displacements at the locations that parts are mounted to the printed wiring assemblies. This information is used for a durability analysis for the different printed wiring assemblies. Fatigue analysis system 204 relates the nodes in merged finite element model 214 to the nodes of the individual printed wiring assemblies. As a result, the data needed for analyzing the durability of a part on a printed wiring assembly may be extracted directly from this model.

With this information, fatigue analysis system 204 uses library 222 to obtain information about the parts. Library 222 may be the same library as library 210. The information in library 222 provides detailed information about the parts for performing the fatigue analysis for the different parts within the unit represented by merged finite element model 214. The finite element analysis simulation used in finite element analysis system 200 and analysis performed in fatigue analysis system 204 in FIG. 2 may be implemented using known simulation and analysis systems.

Figure 3:
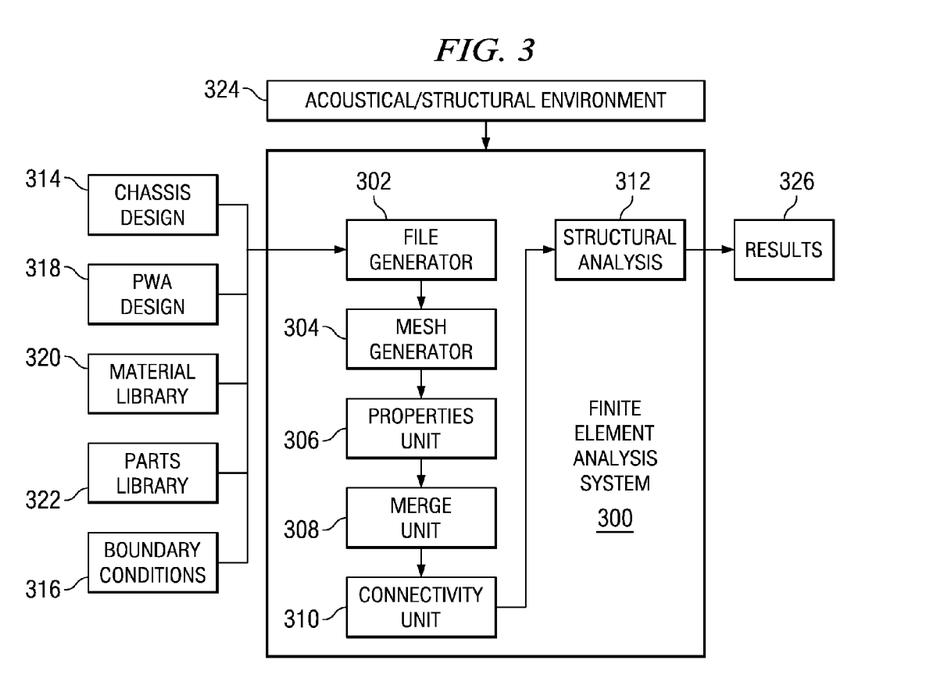
FIG. 3 is a more detailed illustration of a finite element analysis system in accordance with an advantageous embodiment of the present invention.

Turning now to FIG. 3, a more detailed illustration of a finite element analysis system is depicted in accordance with an advantageous embodiment of the present invention. In this example, finite element analysis system 300 is a more detailed illustration of finite element analysis system 202 in FIG. 2. Finite element analysis system 300 includes file generator 302, mesh generator 304, properties unit 306, merge unit 308, connectivity unit 310, and structural analysis 312.

Chassis design 314 is received by file generator 302. This component generates a file from chassis design 314 and boundary conditions 316 that contains information used to generate a mesh for the chassis. Chassis design 314 may be data in a file from a computer aided design system. The information in this design includes, for example, geometry, materials, details of the connection to the external environment and details of printed wiring assembly attachments.

Boundary conditions 316 specify how the chassis is attached to an external environment. For example, this information may include the location at which the chassis is attached to the environment and whether the attachment is made through a rigid or flexible connection to the environment.

In addition, file generator 302 also receives printed wiring assembly design 318. This design is combined with information from material library 320 and parts library 322 to generate a file for each printed wiring assembly for conversion into a mesh for a finite element model.

Printed wiring assembly design 318 includes information about the printed wiring assembly needed to create a finite element model for random vibration analysis. The information in these examples includes geometry describing the printed wiring assembly, materials used to construct the printed wiring assembly, and part locations. Detailed information about the different parts may be obtained through parts library 322. This parts library may contain information, for example, package geometry, package material, and package weight. Material library 320 provides information about the material property of the parts and the board. File generator 302 uses the design, material information and part information to generate a file that may be converted into a mesh for the printed wiring assembly. A file is created for each printed wiring assembly in these examples.

Properties unit 306 creates a mesh for each printed wiring assembly and the chassis from the file generator 302. Each of these meshes is part of a finite element model. At this point, each model contains the proper part and board composite materials for each element. Merge unit 308 takes the meshes through the printed wiring assemblies and merges them with the mesh for the chassis. At this time, the connectivity between the chassis and the printed wiring assemblies also is created. The printed wiring assemblies are two dimensional finite element models, and the chassis is a three dimensional finite element model. In merging or combining the printed wiring assemblies with the chassis, the two dimensional models are transformed into three dimensional models. Then, the transformed two dimensional models are positioned within the three dimensional model. Connections are then created between all of the models to form the combined finite element model for the unit.

In this example, the merge is performed on an assembly by assembly basis until all of the printed wiring assemblies have been merged with the mesh for the chassis. The connectivity between the printed wiring assembly and the chassis is generated through connectivity unit 310. In general, each printed wiring assembly has its own coordinate system. In addition, the nodes in the printed wiring assembly model may not match the nodes of the finite element model of the chassis when the printed wiring assembly finite element model is positioned in the chassis. Finally, the method of attachment between each printed wiring assembly is specified. Connectivity unit 310 processes the meshes in a manner that satisfies these requirements.

After all of the printed wiring assemblies have been merged, and the connectivity has been established, structural analysis 312 performs a structural analysis on the unit using acoustic and structural environment 324. The structural analysis is also referred to as a vibration analysis. This structural analysis includes, for example, simulating vibrations from connections and acoustic sources. The output forms results 326. These results may be used for durability analysis.

In these examples, structural analysis 312 performs the analysis using acoustical and structural environment 324. This input is a specification of the vibration and/or noise environment as a vibration spectrum. Acoustical and structural environment 324 may specify different amplitudes for different vibration frequencies.

In this analysis, the unit is excited with vibrations at the connection points of the chassis. The response of the unit at the printed wiring assembly and the chassis interfaces are computed as an average spectrum, acceleration power spectrum density (PSD) in these examples. The average power spectrum density of each printed wiring assembly at each part computation is extracted from the solution of the combined finite element model. These quantities are passed to the durability analysis unit for fatigue analysis of the components lead and/or solder joints.

Figure 4:
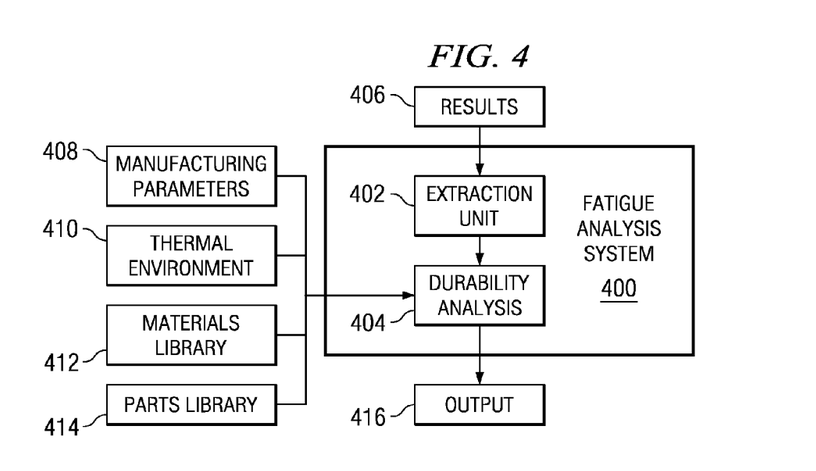
FIG. 4 is a diagram of components in a fatigue analysis system in accordance with an advantageous embodiment of the present invention.

Turning now to FIG. 4, a diagram of components in a fatigue analysis system in depicted in accordance with an advantageous embodiment of the present invention. Fatigue analysis system 400 in an example of fatigue analysis system 204 in FIG. 2. Fatigue analysis system 400 contains extraction unit 402 and durability analysis 404. Extraction unit 402 reads the results 406 from a finite element analysis system, such as results 326 generated by finite element analysis system 300 in FIG. 3. Extraction unit 402 extracts different data from results 406.

For example, the accelerations and displacements of the printed wiring assembly in the vicinity of the parts mounted on the printed wiring assemblies are extracted for use in durability analysis 404. In these examples, the accelerations and displacements of nodes in the unit containing the chassis and printed wiring assembly that also belong to a printed wiring assembly are transformed to the local coordinate system of that printed wiring assembly. The transformation rotates the reference coordinate system for these quantities such that the resulting "x", "y" and "z" accelerations and displacements components are in the direction respectively of the "x", "y" and "z" axes of the individual printed wiring assembly coordinate system. In this manner, the data needed for the part durability analysis is extracted directly from the model of the unit. The information extracted includes, for example, root_mean_square results, such as displacement, stress and zero crossing frequency.

This extracted information is sent to durability analysis 404. This component uses the information extracted by extraction unit 402 along with manufacturing parameters 408, thermal environment 410, materials library 412, and parts library 414 to perform a durability analysis. This information is used to determine the lifecycle of solder interconnections of the part and the board on which the part is located in the printed wiring assembly in these examples. Durability analysis 404 generates output 416, which is displayed, stored, or used in some other manner.

The output provides an ability to identify where in a design fatigue may occur. Fatigue is a failure of an electronic component, such as a solder joint or lead, caused by repeated application of loads. These loads may be heating and cooling and external vibrations. The heating and cooling loads lead to failures because different parts expand and contract at different rates. The vibrations lead to inertial loads that can cause a solder joint or lead to break.

Figure 5:
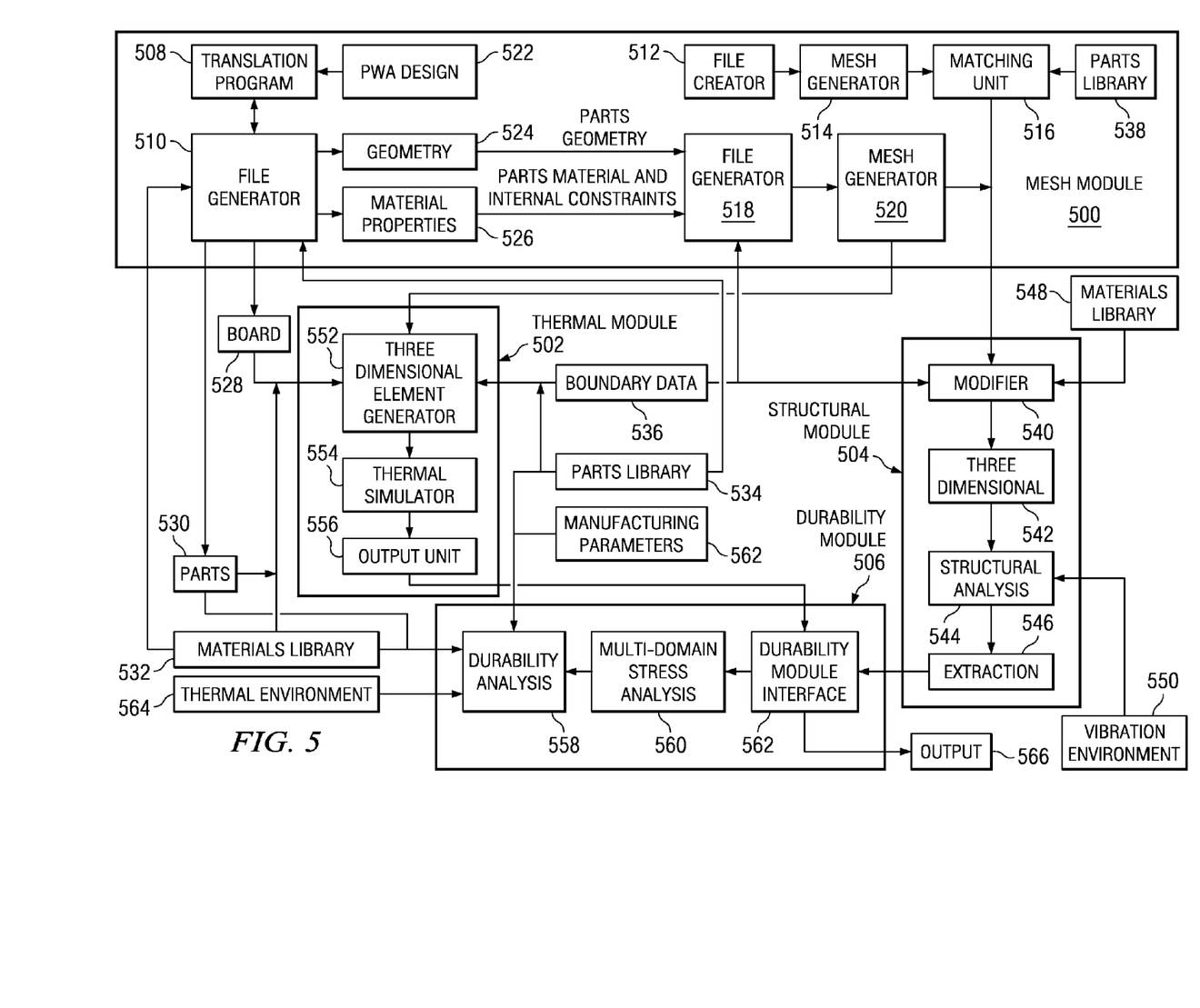
FIG. 5 is a diagram of components used for printed wiring assembly analysis in accordance with an advantageous embodiment of the present invention.

Turning now to FIG. 5, a diagram of components used for printed wiring assembly analysis is depicted in accordance with an advantageous embodiment of the present invention. In these examples, the different embodiments handle files generated by a computer aided design tool exported for use in finite element analysis and handle designs that are not in a format exportable directly for finite element analysis. In this illustrative example, the components include mesh module 500, thermal module 502, structural module 504, and durability module 506. Mesh module 500, thermal module 502, and structural module 504 may be implemented in a finite element analysis system, such as finite element analysis system 202 in FIG. 2. Durability module 506 may be implemented in a fatigue analysis system, such as fatigue analysis system 204 in FIG. 2.

Mesh module includes translation program 508, file generator 510, file creator 512, mesh generator 514, matching unit 516, file generator 518, and mesh generator 520. Translation program 508 and file generator 510 are used in the instance in which a computer aided design file can be written into a format for use in finite element analysis. For example, some computer aided design programs may generate products model data (STEP) files. These types of files follow an international standard, ISO 10303, for representation and exchange of industrial product data. These types of files may be used to exchange data between different programs such as a computer aided design program and a finite element analysis program.

Translation program 508 translates printed wiring assembly design 522 into a STEP file. File generator uses this STEP file to generate four modeling files in these examples. These modeling files include geometry file 524, material properties 526, board file 528, and parts file 530.

These files are generated using information from materials library 532 and parts library 534. Parts library 534 contains information about the different parts and materials library 532 contains properties of materials specified for the different parts. Geometry file 524 contains information about the geometry of the different parts. For example, the size, width, and height of parts may be specified depending on the geometry of the part. Material properties file 526 contains information about the material and internal constraints for the different parts. Board file 528 provides information about the thickness of the board for a particular printed wiring assembly. This information may include material used for the board, thickness, outline, and mesh parameters. Parts file 530 is a parts list that includes the location of the parts and other information such, as power dissipation.

Board file 528 and parts file 530 are used as inputs into file generator 518, which creates a file for each printed wiring assembly for use in creating meshes for these printed wiring assemblies. Boundary data 536 is used along with these two files to create the input for mesh generator 520. Boundary data 536 is used to obtain fastener information in these examples. Mesh generator 520 uses this information to create meshes in finite element models for the printed wiring assemblies.

If the printed wiring assembly design is not in the form of a file that may be exported and converted for use in creating meshes, printed wiring assembly design 522 is then sent to file creator 512. In this embodiment, printed wiring assembly design 522 may be a file containing specifications about the parts and the board information, such as materials, outline, thickness, and mesh parameters. The user may provide parts file 530 or board file 528 through user input or through existing files in these examples. File creator 512 and mesh generator 514 create a mesh from this information. Thereafter, matching unit 516 matches parts with elements and modifies the mesh to include the material property for each element using parts library 538.

Structural module 504 includes modifier 540, three dimensional unit 542, structural analysis 544, and extraction 546. In performing a structural analysis on a single printed wiring assembly, modifier 540 adds boundary data 536 to include structural boundary conditions and loads to the finite element model created by mesh generator 520. This information is added though modifier 540. In these examples, mesh generator 514 and mesh generator 520 do not include the materials for each element in the mesh for the printed wiring assembly. As a result, modifier 540 adds the material property for each element using materials library 548.

Three dimensional unit 542 in structural module 504 converts the two dimensional finite element mesh into a three dimensional mesh to generate a file for structural analysis. Structural analysis 544 performs the structural analysis under vibration environment 550. Vibration environment 550 contains data for the vibration environment that is to be simulated using structural analysis 544. The results from structural analysis 544 are sent to extraction 546, which converts the results into a format for durability analysis within durability module 506.

Thermal module 502 may be used to apply additional types of simulations for the unit. Thermal module 502 may provide thermal cycling in addition to the vibration simulations provided by structural module 504. Thermal module 502 includes three dimensional element generator 552, thermal simulator 554, and output unit 556. Thermal module 502 is used to simulate a thermal environment for a printed wiring assembly. Three dimensional element generator 552 converts a two dimensional mesh generated by mesh generator 514 or 520 into a three dimensional set of elements. The three dimensional generation includes adding information, such as board thickness specified in board file 528, part location and dissipation specified in parts file 530, part dimensions specified by parts library 534, part and board materials specified by materials library 532, and boundary conditions specified by boundary data 536.

This file is then used by thermal simulator 554 to perform a thermal simulation on the printed wiring assembly. Output unit 556 takes the output from thermal simulator 554 and places it into a format that may be used within durability module 506 for durability analysis. Output unit 556 extracts a temperature history at each part location on a printed wiring assembly. A temperature history is a function that determines temperature when the time is presented, realized in the different embodiments of the present invention as a sequence of points, each point comprising a time value coupled with a temperature value.

Durability module 506 includes durability module interface 562, multi-domain stress analysis 560, and durability analysis 558. The results from structural module 504 and thermal module 502 are sent to durability module interface 562, which provides a user interface to initiate the durability analysis and to view and save results. As a result, durability module 506 may provide durability analysis based on different types of finite element analyses. For example, durability module 506 may use the results from vibration simulations generated by structural module 504 and/or results from thermal simulations by thermal module 502.

Multi-domain stress analysis 560 is a stress analysis unit within durability module 506 to analyze leads and individual solder joints. This component computes stress or strain for different components within the printed wiring assembly. The stress or strain generated by multi-domain stress analysis 560 is used by durability analysis 558 to determine if a lead or solder joint can survive under a specified environment. Durability analysis 558 uses manufacturing parameters 562, thermal environment 564 and materials library 532 for performing a durability analysis for a printed wiring assembly. The results of the analysis form output 566. This output provides information on fatigue for the electrical components. The fatigue life depends on peak stress levels and material properties of the lead or solder joint. The multi-domain or other method determines the peak stress levels, and durability analysis predicts the life of the lead or solder joint subjected to a cyclic load of that magnitude.

The different components illustrated in FIGS. 2 through 5 are shown for purposes of illustrating the different embodiments of the present invention and are not meant to limit the manner in which different components may be implemented. The different functions illustrated by the different blocks in these figures may be combined or further separated out into blocks of code, depending on the particular implementation. Further, the actual simulation performed using the models may be implemented using known finite element analysis techniques. Further, the actual creation of finite element models also may be implemented using known techniques. The advantageous embodiments of the present invention combine the different models into a single unit and apply loads to the attachment points for the unit, in these examples, to provide for more accurate analysis of the different components found in the models.

Figure 6:
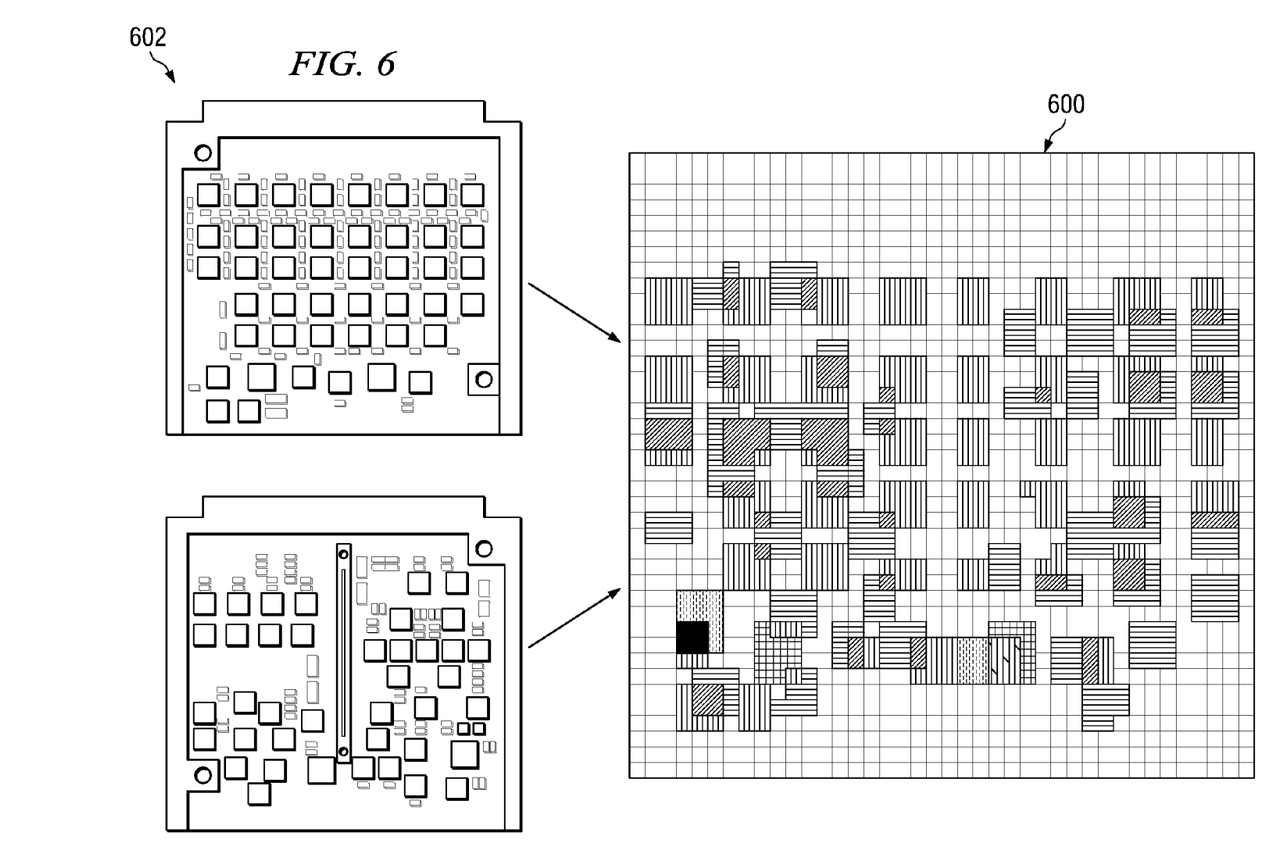
FIG. 6 is a diagram illustrating a mesh in accordance with and advantageous embodiment of the present invention.

Turning now to FIG. 6, a diagram illustrating a mesh is depicted in accordance with and advantageous embodiment of the present invention. In this example, mesh 600 containing parts for both sides of board 602. Mesh 600 is part of a finite element model, and is also referred to as a finite element mesh in these examples. Each element in mesh 600 contains information that describes the characteristics of the element. For example, each element includes an identification of the material and geometry of the element. Mesh 600 may be generated using data exported from a computer aided design program or from user input based on specifications and drawings.

Figure 7:
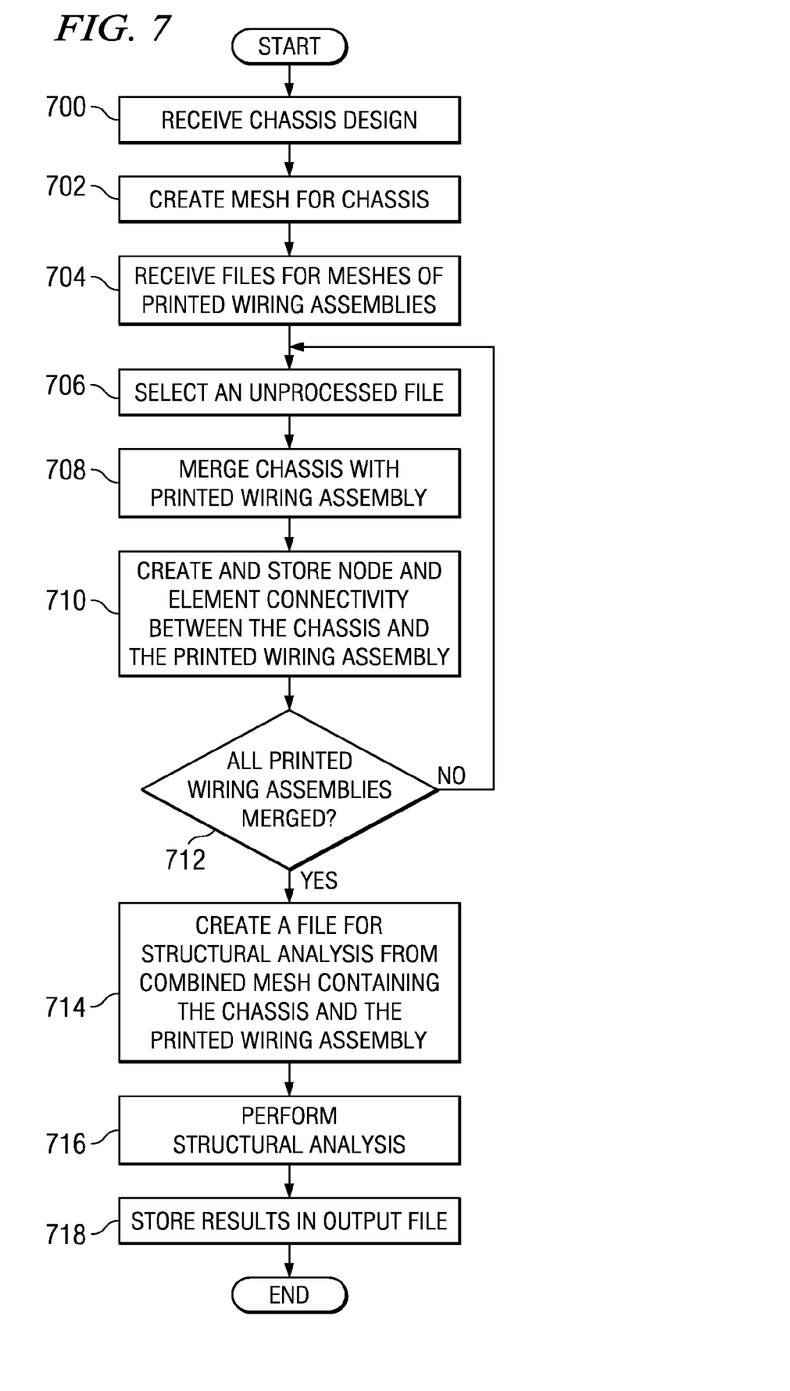
FIG. 7 is a flowchart of a process for performing finite element analysis on a unit containing a chassis and printed wiring assemblies in accordance with an advantageous embodiment of the present invention.

Turning now to FIG. 7, a flowchart of a process for performing finite element analysis on a unit containing a chassis and printed wiring assemblies is depicted in accordance with an advantageous embodiment of the present invention. The process illustrated in FIG. 7 may be implemented in a system, such as finite element analysis system 202 in FIG. 2.

The process begins by receiving the chassis design (operation 700). A mesh for the chassis is created (operation 702). Files are received for meshes of printed wiring assemblies (operation 704). An unprocessed file is selected (operation 706). Next, the process merges the chassis with the printed wiring assembly (operation 708). Node and element connectivity between the chassis and the printed wiring assembly are created and stored (operation 710). Then, a determination is made as to whether all printed wiring assemblies have been merged (operation 712).

If all of the printed wiring assemblies have not been merged in operation 712, the process returns to operation 706 and proceeds as described above. If all of the printed wiring assemblies have been merged in operation 712, the process creates a file for structural analysis from combined mesh containing the chassis and the printed wiring assembly (operation 714). Next, a structural analysis is performed (operation 716). Finally, the results are stored in an output file (operation 718) with the process terminating thereafter.

Figure 8:
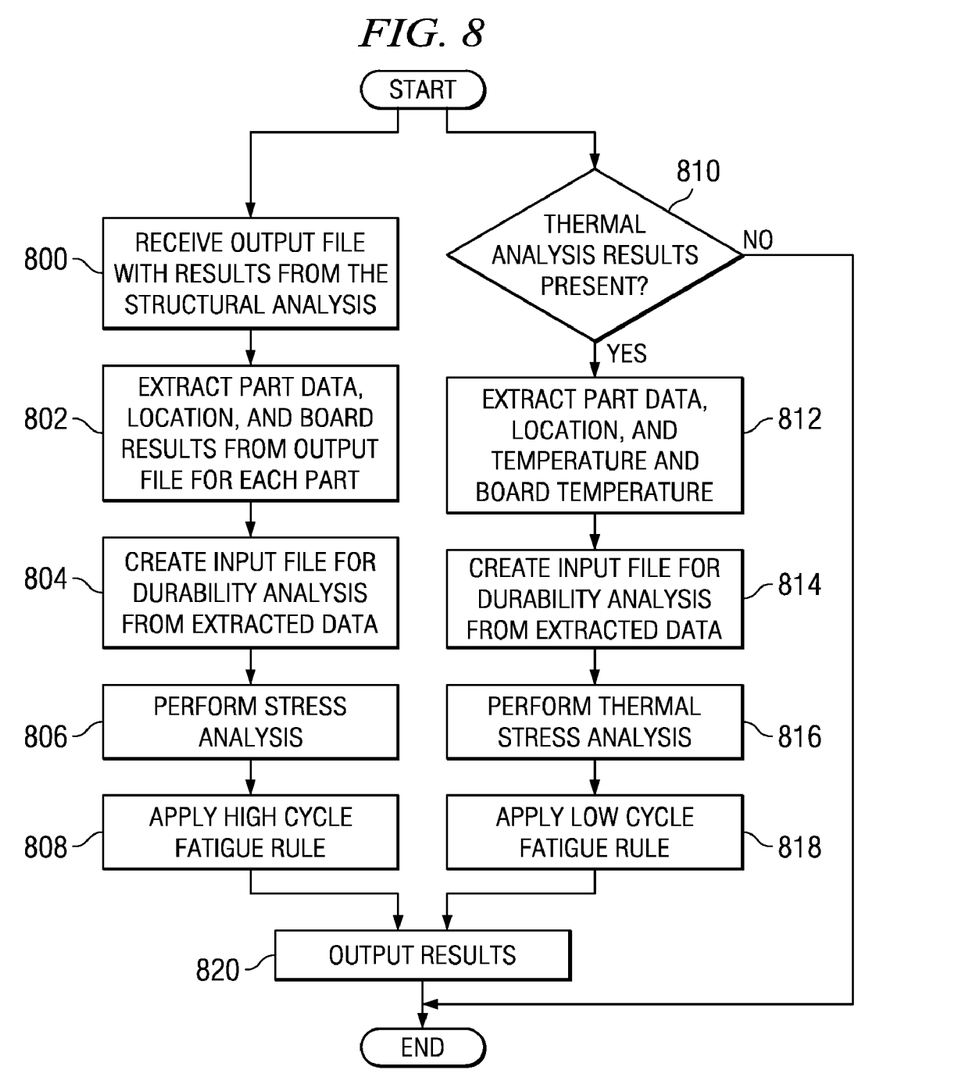
FIG. 8 is a flowchart of a process for performing fatigue analysis on a unit containing a chassis and printed wiring assemblies in accordance with an advantageous embodiment of the present invention.

Turning next to FIG. 8, a flowchart of a process for performing fatigue analysis on a unit containing a chassis and printed wiring assemblies is depicted in accordance with an advantageous embodiment of the present invention. The process illustrated in FIG. 8 may be implemented in a system, such as fatigue analysis system 204 in FIG. 2.

The process begins by receiving an output file with results from a structural analysis (operation 800). Part data, location, and board results are extracted from an output file for each part (operation 802). Next, an input file is created for durability analysis from the extracted data (operation 804). A stress analysis of the lead and/or solder joint is performed (operation 806). The results are then processed using a high cycle fatigue rule for fatigue life calculation (operation 808). In operation 808, a default rule, S-N fatigue rule, is used. Operation 808 may provide the user with a choice to select a different rule depending on the implementation.

In the mean time, the process keeps track of whether thermal analysis results are present (operation 810). If thermal analysis results are present in operation 810, part, location, and board temperature data are extracted from these results (operation 812). Similar to operation 804, an input file is created for durability analysis from the extracted data (operation 814). A thermal stress analysis of the part-solder-board system is performed (operation 816), and the results are used to calculate the fatigue life based on low cycle fatigue rule (operation 818). In operation 818, a fatigue damage rule is applied to the resulting stress and strain from operation 816. Several choices are present, such as fracture base, creep base, and S-N data. This example uses a default rule (Coffin-Manson), which is a strain-based expression that converts strain to number of cycles to failure. The user, however, may be provided with the choice to change to other available fatigue rules under thermal loading. Results from high cycle fatigue and possibly from low cycle fatigue are then output (operation 820) with the process terminating thereafter. The low cycle fatigue is used to calculate a cumulative damage index or what the fatigue life of a given part is under cyclic thermal loading, whereas, high cycle fatigue is a similar cumulative damage index calculation except for a vibration input. In these examples, operation 820 combines the cumulative damage indices from operations 808 and 818 using Miner's linear cumulative damage rule when both thermal and vibration environments are present.

With reference again operation 810, if thermal analysis results are not present for processing, this portion of the process terminates. In this illustrative example, operations 800-808 and operations 810-818 may be performed in parallel or sequentially, depending on the particular implementation.

Figure 9:
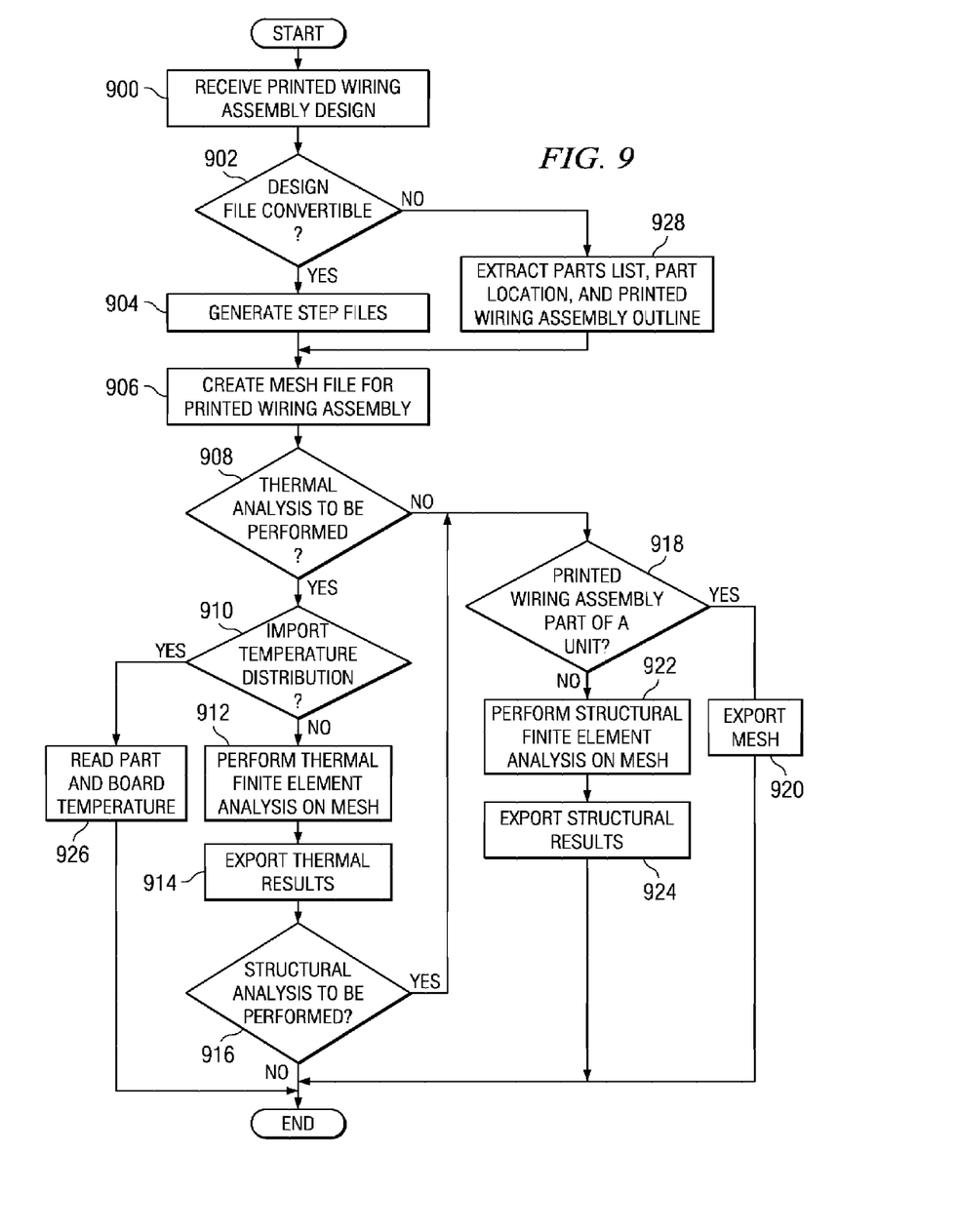
FIG. 9 is a flowchart of a process for performing finite element analysis on a finite element model for a printed wiring assembly in accordance with an advantageous embodiment of the present invention.

Turning now to FIG. 9, a flowchart of a process for performing finite element analysis on a finite element model for a printed wiring assembly in accordance with an advantageous embodiment of the present invention. The process illustrated in FIG. 9 may be implemented in modules for a finite element analysis system, such as thermal module 502 and structural module 504 in FIG. 5.

The process begins by receiving a printed wiring assembly design (operation 900). The process determines if the design file is convertible (operation 902). If the file is convertible, the process generates STEP files (operation 904). A mesh file is created for the printed wiring assembly (operation 906). A determination is made as to whether thermal analysis is to be performed (operation 908). If the thermal analysis is to be performed, the process further determines if temperature distribution is to be imported (operation 910).

If the temperature distribution is not to be imported, the process performs thermal finite element analysis on the mesh (operation 912). In this operation, the process performs an analysis to determine the temperature of the parts and board at the part locations as a function of time. From this temperature history, acquired by importing the analysis data an equivalent stress/strain history of each solder joint/lead, is calculated.

Finally, the durability calculation determines the amount of damage at the solder joint/lead resulting from the stress/strain history as in the vibration case. The calculation of number of cycles to failure from the stress/strain history is the same as in the vibration case. The results are then exported (operation 914). Thereafter, a determination is made as to whether a structural analysis is to be performed (operation 916). If a structural analysis is not to be performed, the process terminates.

The process determines if the printed wiring assembly is part of a unit (operation 918). If it is part of a unit, the mesh is exported (operation 920) with the process terminating thereafter. If the mesh is not part of a unit, a structural finite element analysis is performed on the mesh (operation 922) with the process then exporting the structural results (operation 924). The process then terminates.

Turning back to the determination made in operation 910, if temperature distribution is to be imported, the process reads the part and board temperatures (operation 926) with the process terminating thereafter.

Turning back to the decision made in operation 902, if the process determines that the design file is not convertible, the parts list, part location, and printed wiring assembly outline is exported (operation 928). The process then proceeds to operation 906 as described above.

In these examples, calculations of the number of cycles to failure under thermal and vibration loading are independent. It is possible to analyze printed wiring assemblies under only thermal loading, under only vibration loading, or both. If both analyses are performed, the damage due to the combined loads needs is determined. In this illustrative embodiment, the damage due to thermal and vibration loads are calculated independently and summed together.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 10:
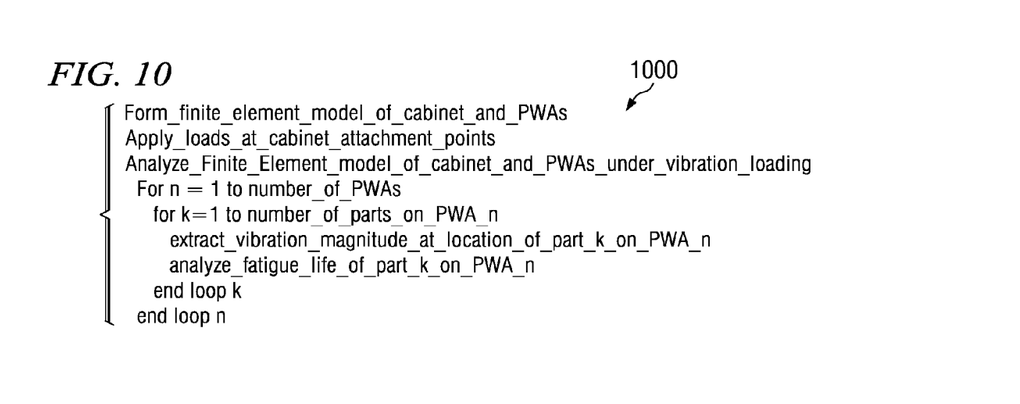
FIG. 10 is a diagram of pseudo code for analyzing a unit in accordance with an advantageous embodiment of the present invention.

Turning now to FIG. 10, a diagram of pseudo code for analyzing a unit under vibration loading is depicted in accordance with an advantageous embodiment of the present invention. Code 1000 may be implemented for use in a finite element analysis system, such as finite element analysis system 202 in FIG. 2 in these examples. In this example, code 1000 illustrates the process used to analyze a cabinet with different printed wiring assemblies connected to the chassis either inside or on the chassis.

A similar process may be applied to a unit for thermal or noise analysis. The thermal loads and cooling mechanisms may be applied and a temperature distribution inside the cabinet would be analyzed with this type of process. From this analysis, the temperature cycling may be extracted for each part location to provide data for part fatigue analysis. With a thermal analysis, the loads are thermal cycles and the finite element model includes a cabinet or chassis cooling system if one is present. Instead of extracting the vibration magnitude at location of the part on the printed wiring assembly, the temperature magnitude is extracted.

Figure 11:
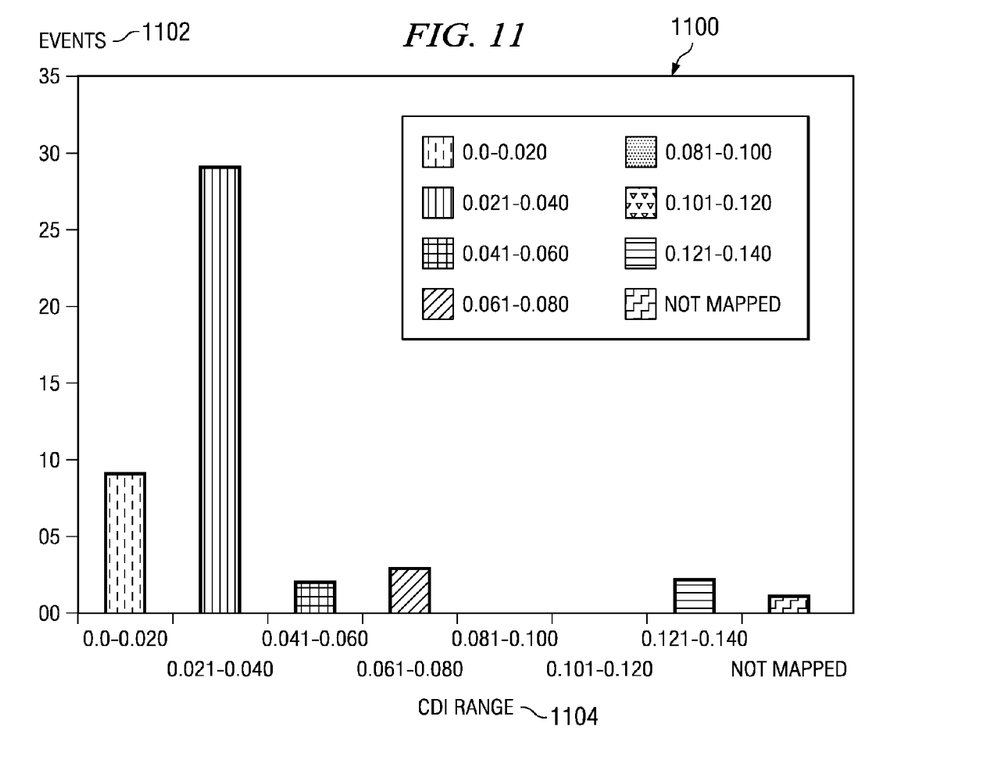
FIG. 11 is a diagram illustrating a distribution of cracked solder joints versus predicted cumulative damage indices in accordance with an advantageous embodiment of the present invention.

Turning now to FIG. 11, a diagram illustrating a distribution of cracked solder joints versus predicted cumulative damage indices is depicted in accordance with an advantageous embodiment of the present invention. In this example, a system processor unit for an AH-64D Longbow Apache Helicopter was modeled and analyzed using the different processes illustrated for the different advantageous embodiments. This system process unit was formed from a chassis with printed wiring assemblies being mounted within the chassis.

The results of this fatigue analysis were compared to actual failures for these types of units. Graph 1100 shows events 1102 on the y axis with respect to cumulative damage indices (CDI) range 1104 on the x axis. In this example, 46 cracked solder joint repairs are shown as a function of the predicted CDI range for the failure site. Most of the failure sites in this unit were due to two solder pattern failures. The remainder was found to be caused from other random manufacturing defects.

Graph 1100 shows that approximately 83 percent of the failures have CDI's of less than around 0.04, which would be expected for failures caused by defects rather than fatigue of healthy solder joints. In this example, the actual failure sites from repairing the units or compared to the predicated failures from the modeling to see if a correlation existed.

Thus, the advantageous embodiments provide a computer implemented method, apparatus, and computer usable program code for analyzing the durability of electronics. A finite element model is created for a chassis and a set of finite element models is created for a set of printed wiring assemblies that are to be placed to within or on the chassis. These printed wiring assemblies include the electronic components for which durability analysis is desired. The finite element model for the chassis is combined with the set of finite element models for the printed wiring assemblies to form a combined a finite element model. A finite element analysis is performed on the combined finite element model to form results. A fatigue analysis for the components in the set of printed wiring assemblies is performed using the results to identify the durability of the electronic components.

Although the illustrative embodiments are directed towards electronics for use in aircraft, other embodiments of the present invention may be applied to other types of uses. For example, the different embodiments may be applied to analyzing the durability of electronic components in a unit for use in a vehicle, such as a car, train, submarine, or boat. Further, the different embodiments may be applied to a vehicle, such as a spacecraft. Further, the different embodiments may be applied to analyze the durability of units that are to be placed in other objects, such as an elevator.

By combining the finite element models for the different components in a unit, the different embodiments provide for a more accurate analysis for printed wiring assemblies that may be placed inside a chassis or housing. With the combined finite element model, vibration loads may be placed on the attachment points for the unit, rather than applying loads to the attachment points for the different printed wiring assemblies. With this type of load application, a more accurate simulation of environmental vibrations may be performed as part of a structural analysis.

Further, the different embodiments of the present invention allow for additional environmental factors to be taken into account in addition to the vibration ones. For example, thermal conditions within the unit may be taken into account along with the vibration factors when analyzing the durability of printed wiring assemblies and their components. In this manner, failures of solder joints and other components may be identified during the design and analysis stage prior to producing prototypes for production forms of these assemblies. In this manner, changes may be made to a design with the new design being re-simulated. These changes may include, for example, changes in part locations, materials, and dimensions.

Thus, the different the analysis performed on a unit may be at least one of a vibration analysis and a thermal analysis. This means that a vibration analysis may be performed, a thermal analysis may be performed, or both types of analysis may be performed.

The different embodiments of the present invention eliminate applying vibration equally to all connections for a printed wiring assembly or chassis as is currently done. Also, the analysis performed on the unit containing the chassis with the printed wiring assemblies provides for more accurate results in performing fatigue analysis. The different embodiments allow for multiple processes to be implemented in parallel to reduce computational time and an ability to identify optimize designs to increase fatigue life using the results of the analysis. The accuracy of the box level analysis is also improved because finite element model of the box is more accurate.

In the embodiments implemented in a computer usable program product with computer usable program code, the code may run of various environments, such as UNIX and Windows. Further, the computer usable program code in the advantageous embodiments may perform durability analysis for both traditional eutectic solder and environmentally friendly lead-free solder when the material properties are known. Further, the different embodiments also enable users to evaluate the commercial off-the-shelf (COTS) parts as well as application specific integrated circuit (ASIC) parts. In addition, the different embodiments enable users to evaluate electronically based design such as those found in step files or to evaluate designs using information from a database gathered manually based on conventional drawings and pictures. Further, these embodiments allow a user to evaluate the electronic design for cyclic thermal loads, vibration loads, or a combination of these types of loads.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A computer implemented method for analyzing durability of electronic components, the computer implemented method comprising:
a processor executing instructions for:
creating a first finite element model for a chassis for the electronic components;
creating a set of second finite element models for a set of printed wiring assemblies for the chassis;
combining the first finite element model with the set of second finite element models to form a combined finite element model;
performing a finite element analysis of the combined finite element model to determine a response of the combined finite element model to a vibration spectrum to form results, wherein vibration loads are applied in the finite element analysis through a mounting location for the chassis and propagate through attachment points for the set of printed wiring assemblies in which the attachments points are points at which the set of printed wiring assemblies are attached to the chassis;
extracting vibration levels at part locations for the set of printed wiring assemblies from the results to form extracted vibration levels;
performing a fatigue analysis for solder connections and leads in the set of printed wiring assemblies using the extracted vibration levels to identify the durability of the electronic components; and
generating an output of the fatigue analysis.

2. The computer implemented method of claim 1 further comprising:
performing the finite element analysis on the combined finite element model to determine the response of the combined finite element model to thermal loads inside the chassis;
extracting temperature history at each part location in the set of printed wiring assemblies to form extracted thermal cycles; and
performing the fatigue analysis for solder connections and leads in the set of printed wiring assemblies using the extracted thermal cycles and the extracted vibration levels.

3. The computer implemented method of claim 1, wherein the combining step comprises:
selecting an uncombined finite element model from the set of second finite element models;
merging the uncombined finite element model with the first finite element model; and
repeating the selecting and merging steps until all of the set of second finite element models have been combined with the first finite element model.

4. The computer implemented method of claim 1, wherein the electronic components comprise a guidance system.

5. The computer implemented method of claim 1, wherein the set of second finite element models is a set of two dimensional finite element models and the finite element model is a three dimensional finite element model of the chassis and wherein the combining step comprises:
transforming the set of two dimensional finite element models into a set of set of three dimensional finite element models;
positioning the set of three dimensional finite element models within the three dimensional finite element model of the chassis; and
creating connections between the set of three dimensional finite element models and the three dimensional finite element model of the chassis to form the combined finite element model.

6. The computer implemented method of claim 1, wherein each finite element model is created from one of a computer aided design file or a database of elements manually entered from a design.

7. A computer implemented method for analyzing durability of electronic components, the computer implemented method comprising:
a processor executing instructions for:
creating a finite element model for the chassis;
creating a set of finite element models for a set of printed wiring assemblies, wherein the printed wiring assemblies are for use with chassis and include the electronic components;

combining the finite element model for the chassis with the set of finite element models to form a combined finite element model;
performing a finite element analysis on the combined finite element model to form results;
performing a fatigue analysis for the electronic components in the set of printed wiring assemblies using the results to identify the durability of the electronic components; and
generating an output of the fatigue analysis.

8. The computer implemented method of claim 7, wherein the step of performing the finite element analysis of the combined finite element model to form results comprises:
performing a finite element analysis on the combined finite element model to determine a response of the combined finite element model to a vibration spectrum to form results, wherein vibration loads are applied in the finite element analysis through a mounting location for the chassis and propagate through attachment points for the set of printed wiring assemblies in which the attachments points are points at which the set of printed wiring assemblies are attached to the chassis.

9. The computer implemented method of claim 8, wherein the step of performing the finite element analysis of the combined finite element model to form results further comprises:
performing the finite element analysis of the combined finite element model to determine the response of the combined finite element model to thermal loads inside the chassis.

10. The computer implemented method of claim 8, wherein the step of performing the finite element analysis further comprises:
performing the finite element analysis of the combined finite element model to determine the response of the combined finite element model to acoustic loads on the chassis.

11. The computer implemented method of claim 8, wherein the step of performing a finite element analysis of the combined finite element model further comprises:
extracting vibration levels for the attachment points to form extracted vibration levels; and
performing the fatigue analysis for solder connections and leads in the set printed wiring assemblies using the extracted vibration levels to identify the durability of the electronic components.

12. The computer implemented method of claim 7, wherein the set of finite element models are a set of two dimensional finite element models and the finite element model is a three dimensional finite element model of the chassis and wherein the combining step comprises:
translating the set of two dimensional finite element models into a set of set of three dimensional finite element models;
positioning the set of three dimensional finite element models within the three dimensional finite element model of the chassis; and
creating connections between the set of three dimensional finite element models and the three dimensional finite element model of the chassis to form the combined finite element model.

13. A computer program product comprising:
a computer readable medium having computer usable program code for, when executed by a computer, analyzing durability of electronics, the computer program product comprising:
computer usable program code for creating a finite element model for the chassis;
computer usable program code for creating a set of finite element models for a set of printed wiring assemblies, wherein the printed wiring assemblies are for use with chassis and include the electronic components;
computer usable program code for combining the finite element model for the chassis with the set of finite element models to form a combined finite element model;
computer usable program code for performing a finite element analysis on the combined finite element model to form results;
computer usable program code for performing a fatigue analysis for the electronic components in the set of printed wiring assemblies using the results to identify the durability of the electronic components; and
computer usable program code for generating an output of the fatigue analysis.

14. The computer program product of claim 13, wherein the computer usable program code for performing a fatigue analysis for components in the set printed wiring assemblies using the results to identify the durability of the aircraft electronics comprises:
computer usable program code for performing a finite element analysis on the combined finite element model to determine a response of the combined finite element model to a vibration spectrum to form results, wherein vibration loads are applied in the finite element analysis through a mounting location for the chassis and propagate through attachment points for the set of printed wiring assemblies in which the attachments points are points at which the set of printed wiring assemblies are attached to the chassis.

15. The computer program product of claim 14, wherein the computer usable program code for performing a finite element analysis of the combined finite element model to form results further comprises:
computer usable program code for performing the finite element analysis of the combined finite element model to determine the response of the combined finite element model to thermal loads inside the chassis.

16. The computer program product of claim 14, wherein the computer usable program code for performing a finite element analysis of the combined finite element model to form results further comprises:
computer usable program code for performing the finite element analysis of the combined finite element model to determine the response of the combined finite element model to acoustic loads on the chassis.

17. The computer program product of claim 14, wherein the computer usable program code for performing a finite element analysis of the combined finite element model to form results further comprises:
computer usable program code for extracting vibration levels for the attachment points to form extracted vibration levels; and
computer usable program code for performing the fatigue analysis for solder connections and leads in the set printed wiring assemblies using the extracted vibration levels to identify the durability of the electronic components.

18. The computer program product of claim 13, wherein the set of finite element models are a set of two dimensional finite element models and the finite element model is a three dimensional finite element model of the chassis and wherein the computer usable program code for combining the finite element model for the chassis with the set of finite element models to form a combined finite element model comprises:

computer usable program code for translating the set of two dimensional finite element models into a set of set of three dimensional finite element models; computer usable program code for positioning the set of three dimensional finite element models within the three dimensional model of the chassis; and computer usable program code for creating connections between the set of three dimensional finite element models and the three dimensional finite element model of the chassis to form the combined finite element model.

19. The computer program product of claim 13, wherein the in finite element analysis is at least one of a vibration analysis and a thermal analysis.

20. The computer program product of claim 13, wherein each finite element model is created from one of a computer aided design file or a database of elements manually entered from a design.

* * * * *